United States Patent [19]

Shepard et al.

[11] Patent Number: 4,945,772

[45] Date of Patent: Aug. 7, 1990

[54] METHOD OF ROLL NIP LOAD MEASUREMENT

[75] Inventors: Michael L. Shepard, Covington; Charles A. Snyder, II, Millboro, both of Va.

[73] Assignee: Westvaco Corporation, New York, N.Y.

[21] Appl. No.: 432,015

[22] Filed: Nov. 6, 1989

Related U.S. Application Data

[62] Division of Ser. No. 277,967, Nov. 30, 1988, Pat. No. 4,901,585.

[51] Int. Cl.$^5$ .............................................. G01L 1/22
[52] U.S. Cl. .................................................. 73/862.55
[58] Field of Search ............... 73/862.38, 862.55, 824, 73/818, 862.39, 862.42, 862.45, 862.46, 826, 1 B

[56] References Cited

U.S. PATENT DOCUMENTS

| | | |
|---|---|---|
| 3,555,895 | 1/1971 | Schmidt . |
| 3,918,302 | 11/1975 | Skelton et al. ..................... 73/1 B X |
| 4,033,183 | 7/1977 | List et al. . |
| 4,175,430 | 11/1979 | Morrison et al. ................ 73/862.55 |
| 4,744,253 | 5/1988 | Hermkens ......................... 73/862.55 |
| 4,848,162 | 7/1989 | Metcalfe et al. ....................... 73/824 |

Primary Examiner—Tom Noland
Attorney, Agent, or Firm—W. A. Marcontell; R. L. Schmalz

[57] ABSTRACT

Disclosed is a method and apparatus for directly measuring the radially applied, compressive nip load between two press rolls. Matched, low angle ramp plates are connected tensilely by a load strip which supports a strain gauge. The assembly, having less than one inch of nip section thickness, is placed in the subject roll nip and loaded normally. Due to the ramp angle base, the two plates are displaced in opposite directions normal to the radial load. The connective load strip opposes the opposite displacement thereby stressing the strain gauge.

1 Claim, 2 Drawing Sheets

METHOD OF ROLL NIP LOAD MEASUREMENT

This is a division of application Ser. No. 07,277,967, filed 11-30-88 and now U.S. Pat. No. 4,901,585.

BACKGROUND OF THE INVENTION

1. Field of the Invention

The present invention generally relates to compressive force measurement. More particularly, the invention provides a method and apparatus for measuring the nip loading force applied compressively between two process rolls.

2. Description of the Prior Art

Numerous web handling processes such as papermaking utilize compressive nip forces as are obtained from two oppositely loaded rolls. When the process requires extremely high nip loads, the rolls are mounted on massive bell cranks or other mechanical means for multiplying the force of hydraulic or pneumatic loading struts.

These mechanical force multiplying devices operate as matched pairs with each assembly of the pair supporting a respective roll axis end. When these mechanical load multipliers are correctly aligned, the fluid pressure applied to the loading struts is directly proportional to the radial nip load. However, slight misalignment or journal wear may cause large resulting nip load differences: notwithstanding identical fluid pressure applied to the respective loading struts. Consequently, it is occasionally necessary to directly measure the load asserted within such a roll nip to verify or calibrate the normal fluid pressure system.

When such test loading is done, it is essential that the subject roll nip be as close to the normal operating position as possible since small relative angle differences between the several links in the force multiplying mechanism result in large resulting load differences. For this reason, process roll nips respective to extremely thin materials such as paper or foil represent a unique difficulty.

It is therefore, an object of the present invention to provide a method and apparatus capable of measuring maximum process nip loads within one inch of a closed nip position.

Another object of the invention is to provide a test load cell having an extremely low sectional profile.

SUMMARY OF THE INVENTION

These and other objects of the invention, as will be apparent from the following description, are accomplished by means of a strain gauge load cell that comprises two matched ramp plates. Both plates are provided with low ramp angle rails along opposite edges. The four rail edges are given a hard, polished finish to minimize their mating friction coefficient. When the ramp plates are assembled with rail edge-to-edge contact, normally applied loads cause a lateral displacement of the two plates. Between the rail pairs, the plates are held together, in opposition to the lateral displacement, by a connective load strip. Such opposition load forces stress the load strip in tension. A strain gauge bonded to the load strip serves to sense the magnitude of such tension. Friction losses and ramp angle resolution corrections are accommodated by electrical calibration to provide a direct report of the normally applied nip load.

BRIEF DESCRIPTION OF THE DRAWING

Relative to the drawing wherein like reference characters designate like or similar elements throughout the several figures of the drawing.

DESCRIPTION OF THE PREFERRED EMBODIMENT

Figure 1:
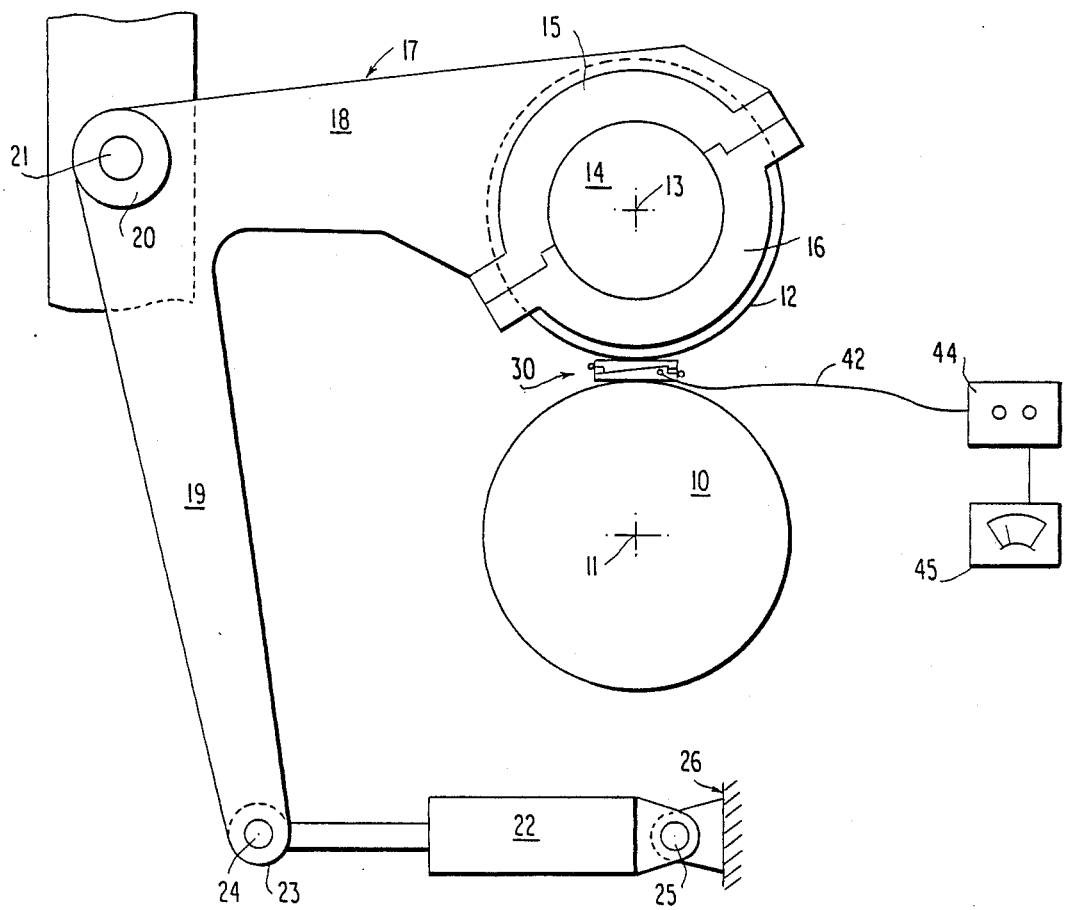
FIG. 1 is an elevational schematic of the invention in an operating environment.

FIG. 1 schematically illustrates a representative mounting arrangement for a pair of high pressure nip rolls such as found in a paper machine wet-press section or on a web or foil embossing machine. Here, the lower roll 10 rotates about a fixed position axis 11 while the upper roll 12 rotates about a movable axis 13. Axle stubs 14 projecting from opposite ends of roll 12 are carried by a journal assembly having a base 15 and cap 16. The journal base 15 is an integral element of or rigidly secured to the short arm 18 of a bellcrank 17. At the elbow formed by the juncture of the bellcrank short arm 18 and long arm 19, a journal 20 is provided to pivot the bellcrank 17 about the axis of a frame mounted axle 21.

Near the distal end of the bellcrank long arm 19, the rod eye 23 of a loading strut 22 is secured by a frame mounted pivot pin 24. A second pivot pin 25 secures the cylinder end of load strut 22 to the machine frame 26. Fluid pressure within the strut 22 cylinder acts upon the rod to torque the bellcrank 17 about the axle 21. Such bellcrank torque loads the upper roll 12 against the lower roll 10. To quantitatively measure that load, the present invention load cell 30 is placed in the nip between the two rolls. More than one such load cell may be distributed along the roll length.

Figure 2:
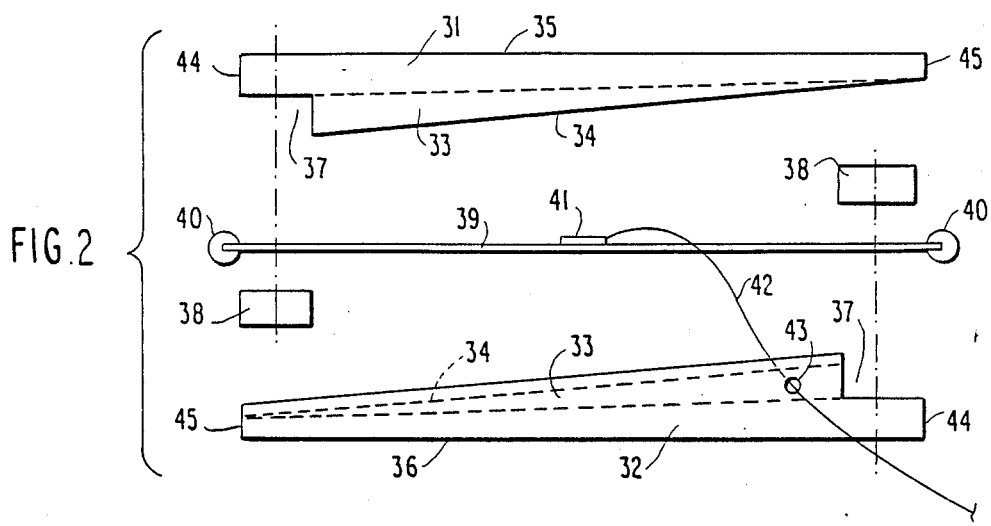
FIG. 2 is an exploded assembly of the invention.
Figure 3:
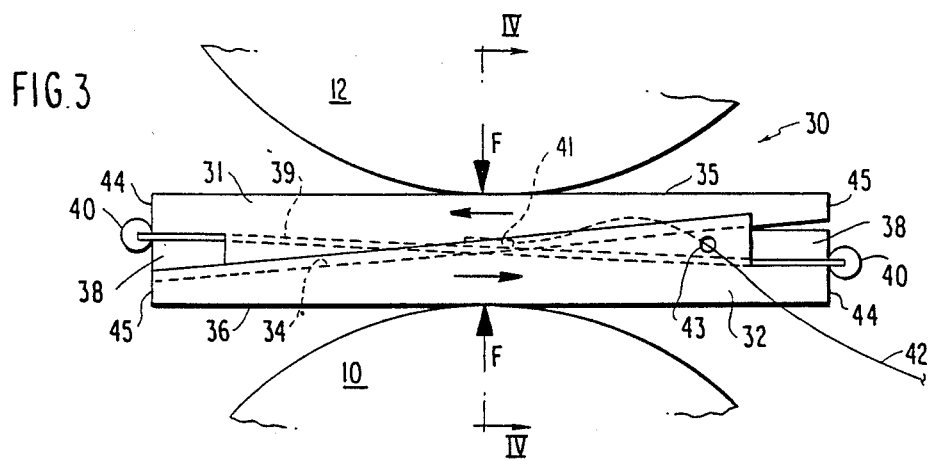
FIG. 3 is an operating assembly of the invention.
Figure 4:
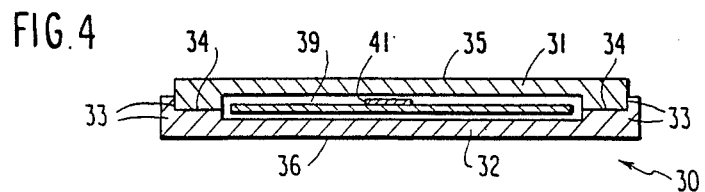
FIG. 4 is a sectional view of the invention taken from the cutting plane IV—IV of FIG. 3.

FIGS. 2, 3 and 4 illustrate the load cell 30 construction as comprising a pair of ramp plates 31 and 32. Each ramp plate includes along respective lateral edges, a pair of tapered rails 33 having hard, smooth, straight edge surfaces 34 at a low plane angle, 5° for example, relative to the exterior plate faces 35 and 36. The length of said rails 33 is less than the length dimension of the plates 31 and 32 between heel and toe end edges 44 and 45, respectively, to provide a notch space 37 which accommodates a key block 38 and the thickness of load plate 39.

Load plate 39 has a width dimension to pass without interference between the inside surfaces of rails 33. Length of the load plate 39 is determined by the length of ramp plates 31 and 32. At each terminal end of the load plate 39 a kerfed spine 40 is secured by means of soldering or swaging. At the center of the load plate, a strain gauge 41 is bonded. Electrical leads 42 from the strain gauge are routed through an aperture 43 in one of the rails 33 to a balance circuit and amplifier 44 (FIG. 1). Responsive signals from the amplifier 44 are reported by analog meter 45 or by digital means not shown. Simple calibration will correlate the meter 45 needle position with a corresponding nip load in pounds or kilograms.

When assembled and normally loaded as shown by the force vectors F in FIG. 3, the two ramp plates 31 and 32 will thrust tensile load on the load plate 39. Such tensile load on the plate 39 results in a proportional change in the strain gauge electrical characteristic which is reported by the meter 45.

Representative dimensions for a load cell 30 as described may include a 14 cm length, a 15 cm width and a 2.25 cm height. The rail surfaces are preferably polished to a 4 micron finish. Thickness of the load plate 39 is determined by the maximum load to be imposed and the associated strain gauge 41.

Having fully described our invention,

We claim:

1. A method of measuring the compressive nip load imposed between two rotatable process rolls comprising the steps of:

providing two parallel face plates in a closed nip between said process rolls, both said face plates having a pair of tapered, parallel bearing rails secured thereto between respective heel and toe face plate edges;

aligning said face plates within said closed nip with bearing rail edge surfaces respective to one face plate being positioned against the bearing rail edge surfaces respective to said other face plate and the heel end of said one face plate is adjacent the toe end of said other face plate whereby the planar distance between the toe ends of respective face plates is increased by relative sliding displacement of said bearing rail edge surfaces as the distance between face plates respective to said parallel face plates is decreased by compressive load between said process rolls;

providing a tensile load plate between said pairs of bearing rails, opposite ends of said load plate being secured to said respective face plate toe ends whereby said planar distance increase between said respective toe plates is opposed by said load plate;

applying strain gauge means to said load plate to measure opposition load imposed thereon by said compressive load between said process rolls; and, calibrating said strain gauge means to report the magnitude of said compressive load between said process rolls.

* * * * *